United States Patent [19]

Koai et al.

[11] Patent Number: 5,194,979
[45] Date of Patent: Mar. 16, 1993

[54] WIDEBAND OPTICAL AMPLIFIER-RECEIVER SYSTEM

[75] Inventors: Kwang-Tsai Koai, Acton; Robert Olshansky, Wayland, both of Mass.

[73] Assignee: GTE Laboratories Incorporated, Waltham, Mass.

[21] Appl. No.: 712,213

[22] Filed: Jun. 7, 1991

[51] Int. Cl.⁵ .............................................. H04B 10/06
[52] U.S. Cl. ..................................... 359/189; 359/193
[58] Field of Search ............... 359/189, 193, 194, 195; 330/308, 59; 372/26, 29

[56] References Cited

U.S. PATENT DOCUMENTS

| | | | |
|---|---|---|---|
| 4,879,761 | 11/1989 | Webb | 330/308 |
| 4,949,397 | 8/1990 | Smoot | 359/189 |
| 5,010,588 | 4/1991 | Gimlett | 359/189 |
| 5,029,240 | 7/1991 | de La Chapelle | 359/189 |

FOREIGN PATENT DOCUMENTS

| | | | |
|---|---|---|---|
| 0372742 | 6/1990 | European Pat. Off. | 359/189 |
| 0127852 | 7/1985 | Japan | 359/189 |

OTHER PUBLICATIONS

"Lightwave Systems With Optical Amplifiers", N. A. Olsson, Journal of Lightwave Technology, vol. 7, No. 7, Jul. 1989, pp. 1017-1082.
"Signal Monitoring Characteristics for Laser Diode Optical Switches", M. Ikeda, Journal of Lightwave Technology, vol. LT-3, No. 4, Aug. 1985, pp. 909-913.
"Laser Amplifier Control in 280 Mbit/s Optical Transmission System", D. J. Malyon et al., Electronics Letters, Feb. 1989, vol. 25, No. 3, pp. 235-236.
"Traveling Wave Semiconductor Laser Amplifier Detectors", M. Gustavsson et al., Journal of Lightwave Technology, vol. 8, pp. 610-617, Apr. 1990.
"100 Mbit/s Laser Diode Terminal With Optical Gain for Fiber Optic Local Area Networks", A. Alping et al., Electronics Letters, vol. 20, No. 19, Sep. 13, 1984, pp. 794-795.
"A Novel All Electrical Scheme for Laser Amplifier Gain Control", A. Ellis et al., Proceedings 14th European Conference on Optical Communications, 1988, pp. 487-490.
Foundations for Microwave Engineering, R. E. Collin, McGraw-Hill, 1966, Chapter 5, pp. 203-257.
Stripline Circuit Design, Harlan Howe, Jr., Artech House, 1974.
"Novel Wide Bandwidth Matching Technique for Laser Diodes", A. Ghiasi et al., IEEE Transactions on Microwave Theory and Techniques, vol. 38, No. 5, May 1990, pp. 673-675.

Primary Examiner—Edward L. Coles, Sr.
Assistant Examiner—Leslie Pascal
Attorney, Agent, or Firm—Lawrence E. Monks

[57] ABSTRACT

A semiconductor optical amplifier is utilized for optical amplification and for detection of an optical signal at the current injection electrode of the optical amplifier. A wide detection bandwidth is provided by utilizing an impedance transformer between the current injection terminal and the detection circuit. The impedance transformer typically has an input impedance of about 1 to 15 ohms. The impedance transformer can be a bipolar junction transistor circuit, a microstrip transmission line impedance transformer or a hybrid impedance transformer. A wide detection bandwidth is also obtained by providing a semiconductor optical amplifier having two current injection electrodes. A bias current is supplied through both current injection electrodes, and both electrodes produce optical gain. However, only one of the electrodes is used for optical signal detection. The detection electrode has a relatively high junction resistance and a relatively high series resistance.

27 Claims, 10 Drawing Sheets

WIDEBAND OPTICAL AMPLIFIER-RECEIVER SYSTEM

FIELD OF THE INVENTION

This invention relates to semiconductor optical amplifiers and, more particularly, to semiconductor optical amplifiers that are used for optical amplification and for detection of optical signals.

BACKGROUND OF THE INVENTION

Optical amplifiers provide the capability to directly amplify an optical signal without first converting the optical signal to an electrical signal. Optical amplifiers are useful as repeaters and preamplifiers in optical communication systems. A semiconductor optical amplifier is typically constructed as a modified laser diode. An optical cavity is fabricated in a substrate with facets which act as mirrors located on opposite ends of the optical cavity. When the device is appropriately biased, the optical cavity has optical gain. In order to provide operation as an amplifier rather than as a laser, antireflection coatings are applied to the facets or the facets are oriented at an angle relative to the optical axis of the cavity. An input optical signal is injected through one of the facets, is amplified in the optical cavity and passes through the facet at the opposite end of the optical cavity. Optical amplifiers are described generally by N. A. Olsson in "Lightwave Systems With Optical Amplifiers", *Journal of Lightwave Technology*, Vol. 7, No. 7, July 1989, pages 1017–1082.

Use of optical amplifiers for optical signal detection is disclosed by M. Ikeda in "Signal Monitoring Characteristics for Laser Diode Optical Switches", *Journal of Lightwave Technology*, Vol. LT-3, No. 4, August 1985, pages 909–913; D. J. Malyon et al in "Laser Amplifier Control in 280 Mbit/s Optical Transmission System", *Electronics Letters*, February 1989, Vol. 25, No. 3, pages 235–236; M. Gustavsson et al in "Traveling Wave Semiconductor Laser Amplifier Detectors", *Journal of Lightwave Technology*, Vol. 8, pages 610–617, April 1990; A. Alping et al in "100 Mbit/s Laser Diode Terminal With Optical Gain for Fiber Optic Local Area Networks", *Electronics Letters*, Vol. 20, No. 19, Sep. 13, 1984, pages 794–795; and A. Ellis et al in "A Novel All Electrical Scheme for Laser Amplifier Gain Control", *Proceedings 14th European Conference on Optical Communications*, 1988, pages 487–490. A modulated optical signal injected into the optical cavity causes a time-varying diode voltage which appears at the current input terminals. The optical amplifier thus detects the modulation of the optical signal. The detected signal can be utilized for signal monitoring, gain control, network control, and the like.

In order to increase the information carrying capability of optical communication systems, microwave multiplexing of optical signals has been proposed. In these systems, a wideband microwave signal composed of many frequency multiplexed microwave subcarriers is used to intensity modulate a high speed laser diode. The optical signal is transmitted through a conventional single mode optical fiber. The microwave subcarriers can be modulated by either analog or digital signals and can be used to carry voice, data, video, digital audio and high definition video. Bandwidths of 1 to 20 gigahertz can be achieved in subcarrier multiplexed optical communications systems.

It has been suggested in the prior art that the maximum detection bandwidth of an optical amplifier is on the order of several hundred megahertz. This would severely limit the application of optical amplifiers as detectors in subcarrier multiplexed optical communication systems, which frequently have a bandwidth in excess of one gigahertz. Accordingly, it is desirable to provide optical amplifiers having wide detection bandwidths.

It is a general object of the present invention to provide improved optical communication systems.

It is another object of the present invention to provide semiconductor optical amplifier-receiver systems having wide detection bandwidths.

It is a further object of the present invention to provide optical amplifier-receiver systems utilizing impedance transformers for providing wide detection bandwidths.

It is yet another object of the present invention to provide optical amplifier receiver systems having detection bandwidths on the order of several gigahertz.

It is a further object of the present invention to provide optical amplifier receiver systems which simultaneously function as in line optical amplifiers and wideband receivers.

SUMMARY OF THE INVENTION

According to the present invention, these and other objects and advantages are achieved in an optical amplifier receiver system comprising a semiconductor optical amplifier having an optical input for receiving an optical signal comprising an optical carrier modulated by a modulation signal, an optical output for providing an amplified optical signal, and a current injection electrode, a bias current source connected to the current injection electrode of the optical amplifier for supplying a bias current to the optical amplifier, a detection circuit suitable for receiving the modulation signal, the detection circuit having a characteristic input impedance, and an impedance transformer for coupling the modulation signal from the current injection electrode of the optical amplifier to the input of the detection circuit, the impedance transformer having an input impedance that is lower than the characteristic input impedance of the detection circuit The detection circuit can be an RF or microwave receiver or amplifier having an input impedance of 50 ohms. The impedance transformer, typically having an input impedance of about 1 to 15 ohms, significantly increases the detection bandwidth of the optical amplifier-receiver system in comparison with a system wherein a 50 ohm load is connected directly to the current injection electrode of the optical amplifier.

It has been discovered that the signal current and the internal noise of the optical amplifier have approximately the same frequency response. As a result, the intrinsic carrier-to-noise ratio of the optical amplifier is essentially constant to very high frequencies. The overall carrier to noise ratio of the system is degraded by thermal noise in the detection circuit. By providing a low impedance load on the current injection terminal of the optical amplifier, the degradation in carrier-to noise ratio is overcome, and the operating bandwidth is significantly increased.

In one embodiment of the invention, the impedance transformer comprises a low input impedance transistor circuit, such as a bipolar transistor operated in a common base mode. An equalizer is used to obtain a flat, wideband signal response.

In another embodiment of the invention, the impedance transformer comprises a passive microstrip impedance transformer such as a tapered transmission line or a multiple section quarter wave transmission line. The tapered transmission line can have an exponential taper, a Chebyshef taper, a triangular taper, or any other suitable taper. The multiple section quarter wave impedance transformer can be a Chebyshef transformer or a binomial transformer.

In accordance with yet another embodiment of the invention, the impedance transformer comprises a passive hybrid impedance transformer. The hybrid impedance transformer includes a microstrip transmission line impedance transformer in combination with a lumped element transformer to further lower the input impedance. The microstrip transmission line can be a tapered transmission line or a multiple section quarter wave transformer as described above. The lumped element transformer can include a length of microstrip transmission line having a shunt capacitor at each end.

BRIEF DESCRIPTION OF THE DRAWINGS

For a better understanding of the present invention, together with other and further objects, advantages and capabilities thereof, reference is made to the accompanying drawings which are incorporated herein by reference and in which.

DETAILED DESCRIPTION OF THE INVENTION

Figure 1A:
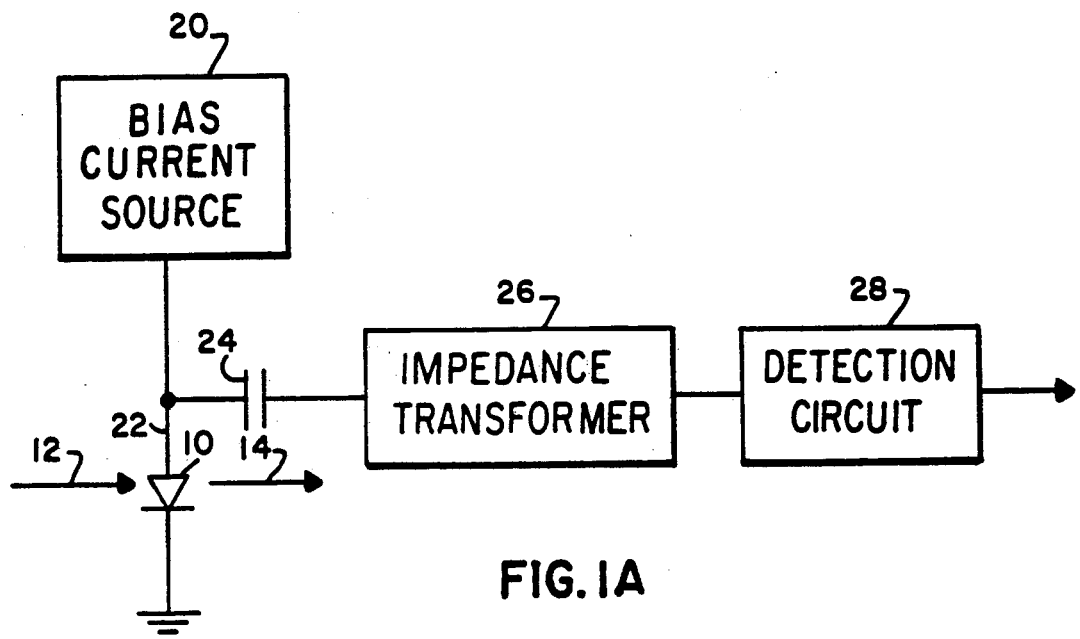
FIGS. 1A and 1B are block diagrams of optical amplifier receiver systems in accordance with the invention.

An optical amplifier receiver system in accordance with the invention is shown in FIG. 1A. A semiconductor optical amplifier 10 receives an input optical signal at an optical input 12 and provides an amplified optical signal at an optical output 14. By way of example, the optical amplifier 10 may be part of an optical communication system and the input optical signal may be received from a remote location on an optical fiber. The input optical signal comprises one or more optical carriers, each modulated with an information carrying modulation signal. A bias current source 20 supplies a DC bias current to a current injection terminal 22 of the optical amplifier 10. The bias current supplied to current injection terminal 22 is typically on the order of about 10 to 200 milliamps.

The current injection terminal 22 is connected through a coupling capacitor 24 to the input of an impedance transformer 26. The output of impedance transformer 26 is connected to the input of a detection circuit 28. The impedance transformer 26 is described in detail hereinafter. The detection circuit 28 is typically an RF or microwave receiver having a 50 ohm input impedance. However, the detection circuit 28 can be any suitable electrical circuit for utilizing the electrical signal that appears at the current injection terminal 22 in response to the input optical signal.

Figure 1B:
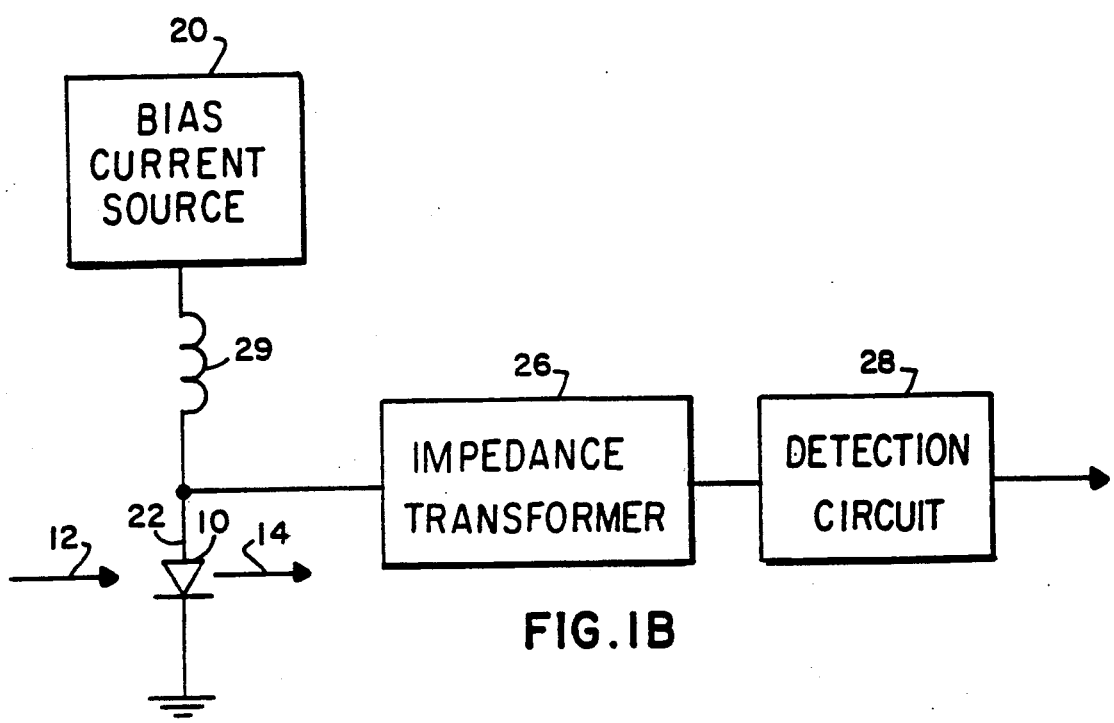

An alternative embodiment of the amplifier-receiver system is shown in FIG. 1B. In the embodiment of FIG. 1B, the bias current source 20 is connected to optical amplifier 10 through an inductor 29 which blocks AC signals from bias current source 20. The input of impedance transformer 26 is connected directly to the current injection terminal 22 of optical amplifier 10.

Figure 2A:
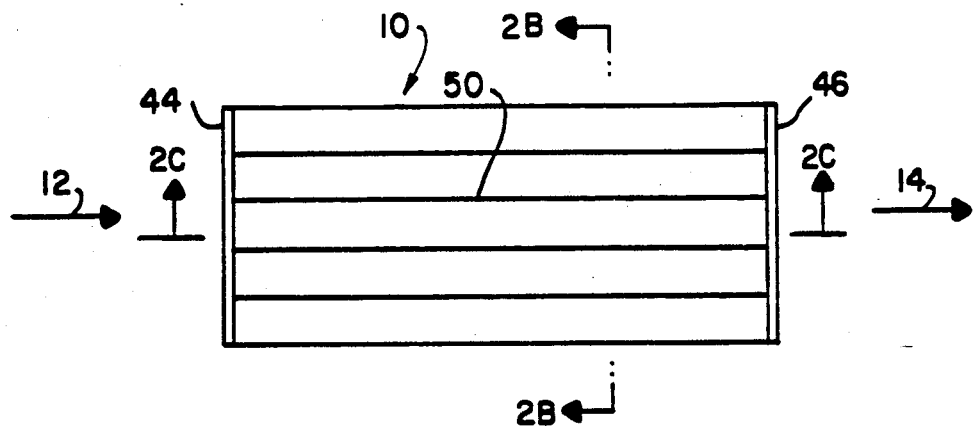
FIG. 2A is a simplified top view of a semiconductor optical amplifier.
Figure 2B:
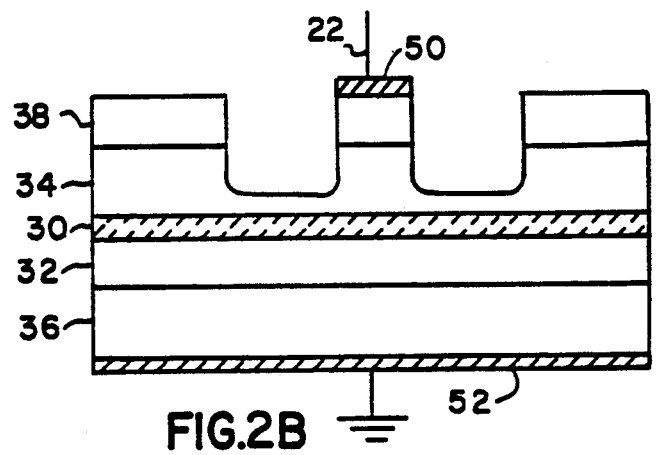
FIG. 2B is a cross sectional view of the optical amplifier taken along the line 2B—2B of FIG. 2A.
Figure 2C:
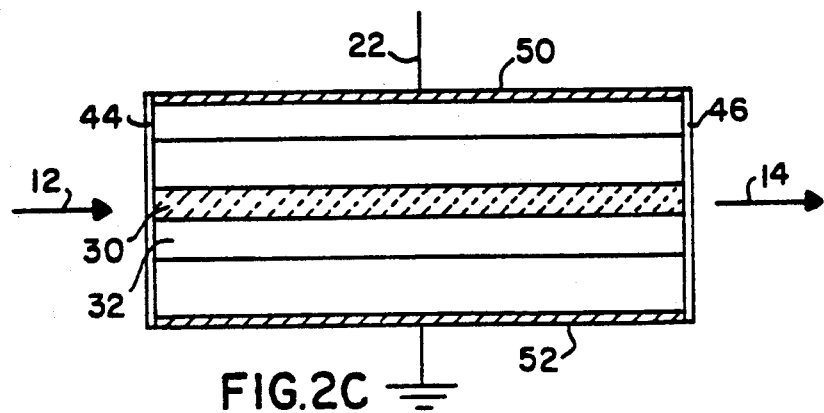
FIG. 2C is a cross-sectional view of the optical amplifier taken along the line 2C—2C of FIG. 2A.

The semiconductor optical amplifier 10, as shown in FIGS. 2A–2C, is typically a modified laser diode. The optical amplifier includes an active region 30, a lower cladding layer 32, an upper cladding layer 34, a substrate 36 and a cap layer 38. Preferably, the active region 30 comprises InGaAsP, the lower cladding layer comprises n-InP, the upper cladding layer 34 comprises p-InP, the substrate 36 comprises n-InP, and the cap layer 38 comprises p-InGaAsP. The active region 30 has facets 44 and 46 at opposite ends. The active regions 30 between facets 44 and 46, as best shown in FIG. 2C, comprises an optical cavity. In order to operate the device as an optical amplifier, the reflectivity of facets 44 and 46 is reduced by applying antireflection coatings to facets 44 and 46 and/or by tilting the facets with respect to their normal orientation perpendicular to the optical axis.

The active region 30 and the cladding layers 32 and 34 form a semiconductor diode. A current injection electrode 50 and a ground electrode 52 on opposite sides of active region 30 permit the device to be biased at a predetermined bias current by the bias current source 20. The current injection terminal 22 is connected to current injection electrode 50. In operation as an amplifier, optical energy is injected through one of the facets into the optical cavity, is optically amplified in the active region and passes through the other facet with negligible reflection. Techniques for construction of semiconductor optical amplifiers are generally known in the art and are described in the aforementioned publication by N. A. Olsson, which is hereby incorporated by reference.

Figure 3:
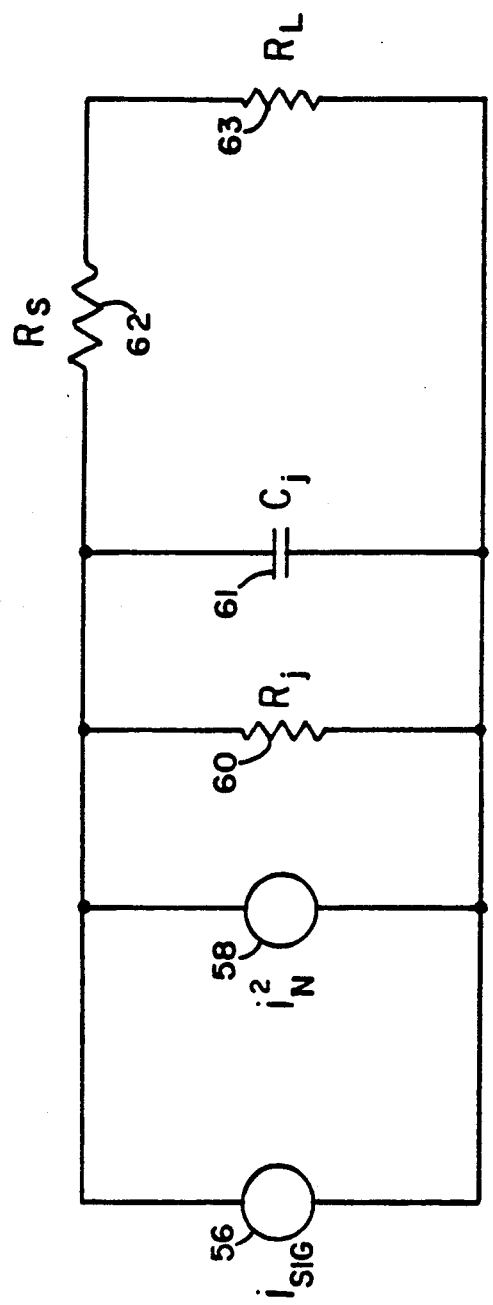
FIG. 3 is an equivalent circuit diagram of the semiconductor optical amplifier used as a detector.

When the optical amplifier 10 is used to amplify an optical signal comprising an optical carrier that is modulated by an information-carrying modulation signal, the amplifier can also act as a detector, and the modulation signal appears at the current injection terminal 22. The electrical response at current injection terminal 22 of optical amplifier 10 to an input signal can be understood from the equivalent circuit diagram of FIG. 3. The amplifier receiver is modeled by a signal source 56 ($I_{sig}$) and a noise source 58 ($I^2_n$) in parallel with a junction resistance 60 ($R_j$) and junction capacitance 61 ($C_j$). These elements are connected in series with a series resistance 62 ($R_s$). The load is represented by a resistance 63 ($R_L$). For an input power $P_{in}$, the signal current $I_{sig}$ is given as $$I_{sig} = [(\eta P_{in})/1 + (\omega\tau)^2]^{\frac{1}{2}} \quad (1)$$

where the responsivity $\eta$ is given by $$\eta = n_{sp}(G-1)e/h\nu \quad (2)$$

where $n_{sp}$ is the population inversion parameter of the optical amplifier (about 1.5), G is the amplifier gain, $h\nu$ is the photon energy, $\tau$ is the carrier lifetime, and $\omega$ is the modulating frequency carried by the optical signal. From equation (1), it is usually concluded that the 3dB detection bandwidth of the optical amplifier is $(2\pi\tau)^{-1}$.

The full performance of the optical amplifier-receiver can be analyzed only if the noise terms are included. There are three significant noise terms.

1. Electrical shot noise, $I^2_{shot}$ $$I^2_{shot} = 2qI_a/[1+(\omega\tau)^2] \quad (3)$$

where $I_a$ is the DC bias current of the optical amplifier and q = the electronic charge.

2. Signal-spontaneous beat noise $I^2_{sig-sp}$ $$I^2_{sig-sp} = n_{sp}^2(\log G) 2e^2 n_{sp}(G+2\log G-4)G \\ P_{in}/h\nu/[1+(\omega\tau)^2] \quad (4)$$

3. Spontaneous emission beat noise $I^2_{sp-sp}$ $$I^2_{sp-sp} = 2n_{sp}^2(\log G)e^2 n_{sp}^2 G (G+4\log G-12)\Delta f/[1+(\omega\tau)^2] \quad (5)$$

where $\Delta f$ is the spontaneous emission width, generally taken as about 40 nanometers or 6000 GHz.

From the circuit model, it can be seen that the three optical noise sources (2 beat noise sources and shot noise), and the detected signal all roll off as $1/[1+(\omega\tau)^2]$. Thus, the intrinsic carrier-to noise ratio ($CNR_i$) for this device is flat to very high frequencies.

$$CNR_i = I_{sig}^2/(I^2_{shot} + I^2_{sig-sp} + I^2_{sp-sp}) \quad (6)$$

Furthermore, the intrinsic sensitivity is very high and is essentially dominated by signal-spontaneous beat noise.

For a typical amplifier with $I_a = 40$ milliamps, $n_{sp} = 1.5$, $GP_{in} = 1$ milliwatt, one finds that for low frequencies and amplifier gains of 20 dB and 26 dB, the noise terms are:

|  | G = 20 dB | G = 26 db |
|---|---|---|
| $I^2_{shot}$ | $1.3 \times 10^{-20} A^2/Hz$ | $1.3 \times 10^{-20} A^2/Hz$ |
| $I^2_{sp-sp}$ | $2.8 \times 10^{-20} A^2/Hz$ | $5.8 \times 10^{-19} A^2/Hz$ |
| $I^2_{sig-sp}$ | $2.5 \times 10^{-19} A^2/Hz$ | $1.3 \times 10^{-18} A^2/Hz$ |

The fraction of the signal or noise current which appears across the load resistor $R_L$ is given by $R_j/R_T$, where $R_T$ is given by $R_T = R_j + R_s + R_L$. A typical value for $R_j$ is about one ohm, and a typical value for $R_s$ is about two ohms. Thus, the fraction of the signal or noise current appearing across a 50 ohm load is only 2% of the signal current $I_{sig}$.

Typical thermal noise for a 50 ohm amplifier is $I^2_{th} = 1.6 \times 10^{-22} A^2/Hz$. However, since the noise current appearing across the load is effectively reduced by $(R_j/R_T)^2$ or $4 \times 10^{-4}$, the detected noise current for an amplifier with gain G=20 dB is $1.0 \times 10^{-22} A^2/Hz$. Thus, the detected noise current is comparable to the thermal noise.

The carrier-to-noise ratio CNR of the optical amplifier-receiver system is thus degraded by about 3 dB by the thermal noise of the receiver. The situation is more serious at high frequencies because of the frequency response of the optical amplifier. For a 50 ohm load, the carrier-to noise ratio is degraded by about 5 dB at $\omega\tau = 1$, and the degradation is 8.4 dB at $\omega\tau = 2$.

In accordance with the present invention, there is provided an optical amplifier receiver which overcomes the bandwidth limitations and the carrier to noise degradation produced by thermal noise. These limitations are overcome by providing an impedance transformer having a low input impedance to match the low impedance of the optical amplifier. This technique improves the low frequency CNR and prevents the CNR from being degraded at higher frequencies. Since the signal power rolls off at 6 dB per octave, the detection circuit requires an equalizer with a response that increases at 6 dB per octave to obtain a flat wideband signal response. The expression for carrier-to noise ratio CNR of the optical amplifier-receiver system is given by $$CNR = \{(R_j R_T)^2 I^2_{sig}[1+(\omega\tau)^2]\}/\{(R_j/R_T)^2 I^2_{noise}/[1+(\omega\tau)^2] + I^2_{th}\} \quad (7)$$

The intrinsic carrier-to-noise ratio $CNR_i$ of the optical amplifier is given by equation (6) and is independent of frequency. As a result of receiver thermal noise, the CNR is degraded by the factor $F(\omega)$ $$F(\omega) = \{1 + [1+(\omega\tau)^2](R_T/R_j)^2 I^2_{th}/I^2_{noise}\} \quad (8)$$

The bandwidth at which the CNR is degraded by 3 dB is given as $$BW = 1/(2\pi\tau) \{R_j/R_T)^2 (I^2_{noise}/I_{th}^2) + 1\}^{\frac{1}{2}} \quad (9)$$

The bandwidth at which the CNR is degraded by 3 dB can be expressed as $$B\omega = (\tfrac{1}{2}\pi\tau)F \quad (10)$$

where F is a bandwidth factor given by $$F = \{R_j^2 I_n^2 / R_T^2 I_{th}^2 + 1\}^{\frac{1}{2}} \quad (11)$$

The bandwidth factor F does not include bandwidth limitations from components that are external to the optical amplifier. Since the ratio $(R_T/R_j)^2$ is as large as 2000 for a typical optical amplifier ($R_j = 1$ ohm and $R_T = 50$ ohms), large improvements in the amplifier response can be achieved by effectively reducing the load impedance $R_L$ to several ohms.

Figure 4:
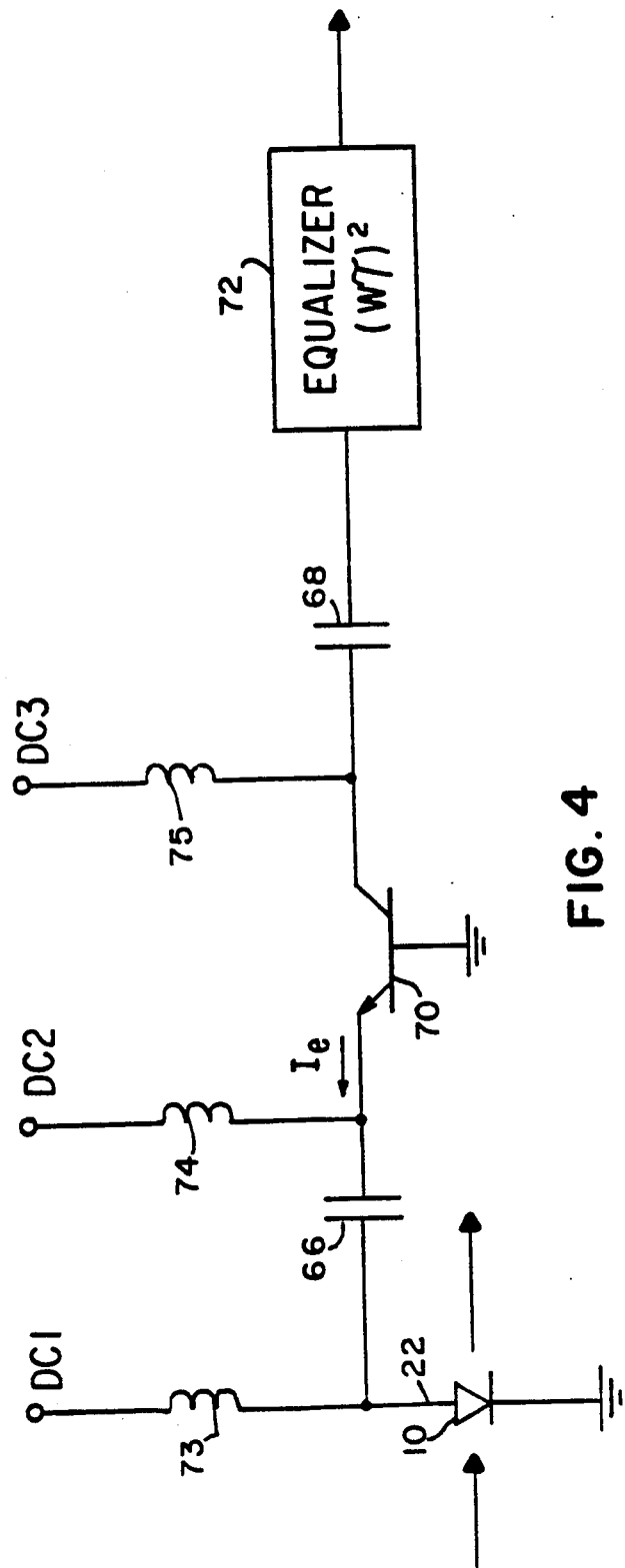
FIG. 4 is a schematic diagram showing a bipolar transistor impedance transformer and equalizer connected to an optical amplifier in an optical amplifier-receiver system.

An embodiment of the invention wherein the impedance transformer 26 comprises a bipolar transistor operated in the common base mode is shown in FIG. 4. The emitter of an NPN transistor 70 is connected through a coupling capacitor 66 to the current injection terminal 22 of optical amplifier 10, and the collector of transistor 70 provides an output signal through a coupling capacitor 68 to an equalizer 72. A bias current for optical amplifier 10 is supplied from a bias source DC1 through an inductor 73 to current injection terminal 22. A bias current is supplied from a bias source DC2 through an inductor 74 to the emitter of transistor 70, and a bias current is supplied from a bias source DC3 through an inductor 75 to the collector of transistor 70. It will be understood that other transistor circuits and biasing arrangements can be utilized within the scope of the present invention.

The input impedance of the transistor 70 is given by the emitter junction resistance $2kT/I_e$. The DC emitter current $I_e$ can be adjusted as desired by controlling the emitter base voltage $V_{eb}$ of the transistor. Consider an example where the emitter current is 10 milliamps and the emitter resistance is 5 ohms. The value of $R_T$ is 8 ohms, and the CNR can be calculated from Equation (7). For an output power $P_{out} = 1$ milliwatt, the following can be calculated for optical gains of 20 dB and 26 dB.

|  | $R_L = 50$ ohms | $R_L = 5$ ohms |
|---|---|---|
| G = 20 dB |  |  |
| CNR ($\omega = 0$) | 125 dB · Hz | 129 dB · Hz |
| 3 dB BW | 640 MHz | 2.7 GHz |
| G = 26 dB |  |  |
| CNR ($\omega = 0$) | 120 dB · Hz | 121 dB · Hz |
| 3 dB BW | 1.1 GHz | 6.8 GHz |

From the above examples, it is clear that the transistor matching circuit produces a bandwidth increase from 500 MHz to 3 to 6 gigahertz depending on the optical amplifier gain. The carrier to noise ratios listed above are very large. For a 2 gigabits per second baseband signal, the required receiver bandwidth is 1.3 GHz. A CNR of 121 dB·Hz gives a total CNR of 30 dB, which can be compared to a value of 16 dB required for a $10^{-9}$ bit error rate. The optical amplifier 10 and the bipolar transistor 70 with associated circuitry can be packaged in a hybrid integrated circuit or a monolithic integrated circuit.

Figure 5:
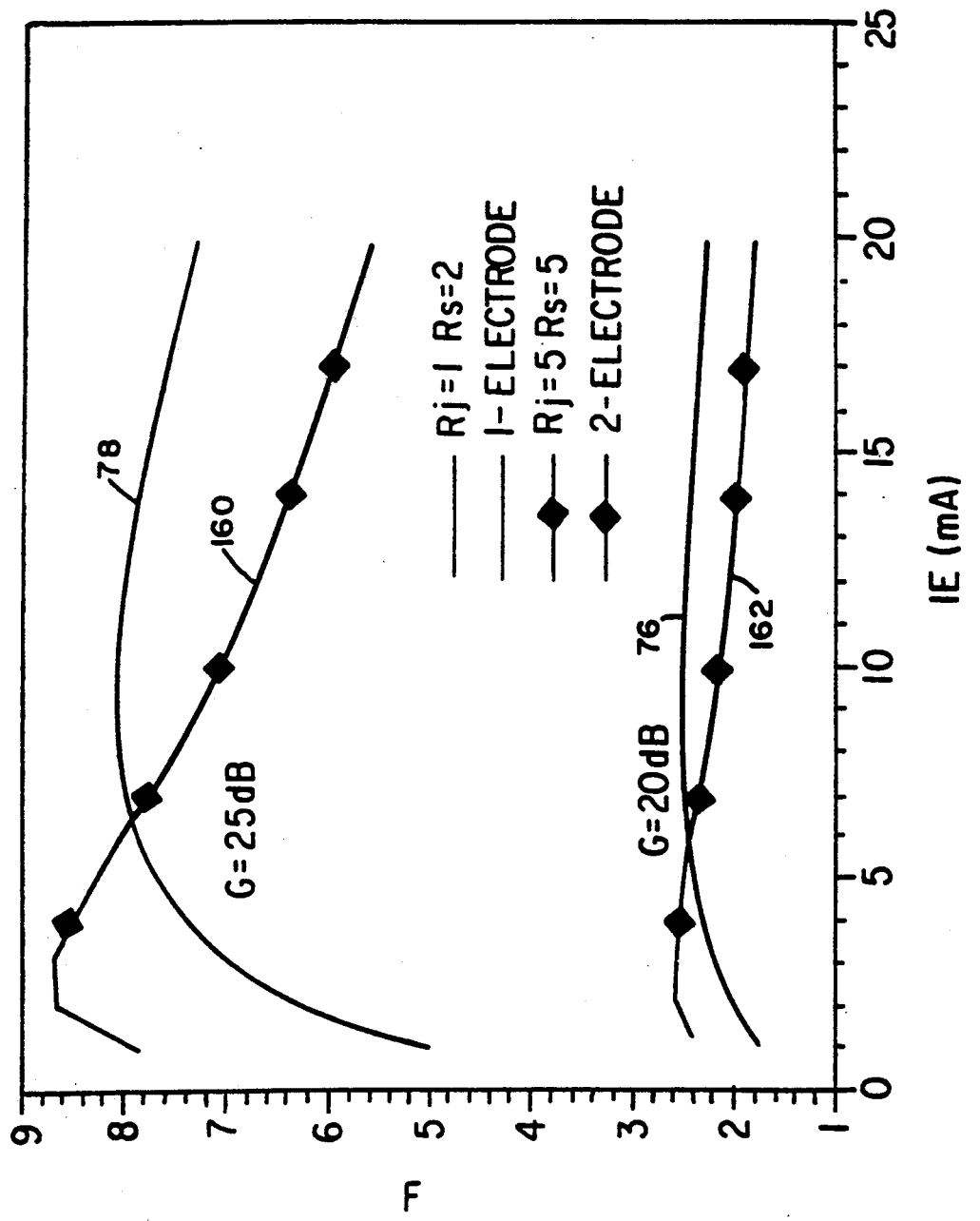
FIG. 5 is a graph showing bandwidth factor F as a function of emitter current for the bipolar transistor impedance transformer, for different amplifier configurations.

The calculated performance of the optical amplifier with a bipolar transistor for impedance matching is shown in FIG. 5. The bandwidth factor F as given by equation (11) is plotted as a function of the emitter current $I_e$ of transistor 70. A curve 76 illustrates the bandwidth factor F for an amplifier gain of 20 dB, and a curve 78 illustrates the bandwidth factor F for an amplifier gain of 25 dB. In each case, the junction resistance $R_j = 1$ ohm and the series resistance $R_s = 2$ ohms.

By comparison, the bandwidth factor F for a 50 ohm load under these conditions is about 4.

Figure 6:
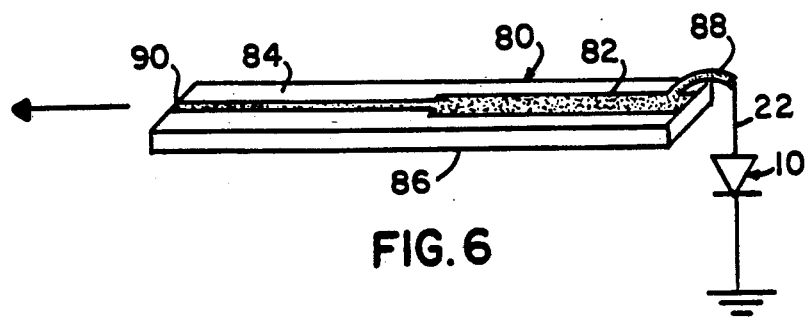
FIG. 6 is a schematic diagram of a microstrip impedance transformer connected to a semiconductor optical amplifier in an optical amplifier-receiver system.

Another embodiment of the impedance transformer 26 is shown in FIG. 6. A passive microstrip impedance transformer 80 includes a patterned conductor 82 affixed to one surface of a dielectric substrate 84. A ground plane conductor 86 is affixed to the other surface of substrate 84. A bond wire 88 is attached between current injection electrode 22 of optical amplifier 10 and one end of conductor 82. The opposite end 90 of conductor 82 is connected to the input of detection circuit 28.

Figure 7:
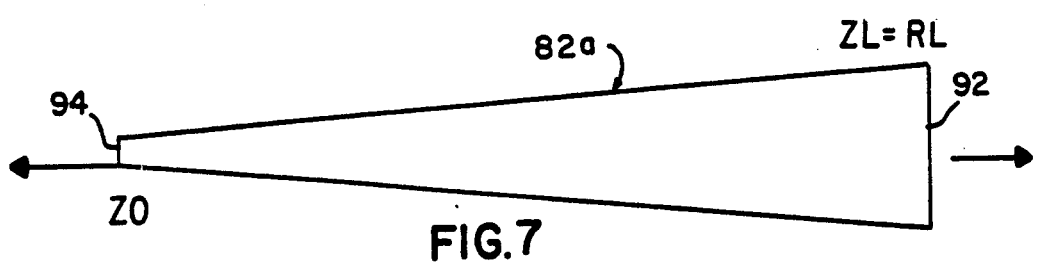
FIG. 7 is a schematic diagram of a tapered microstrip transmission line impedance transformer.
Figure 8:
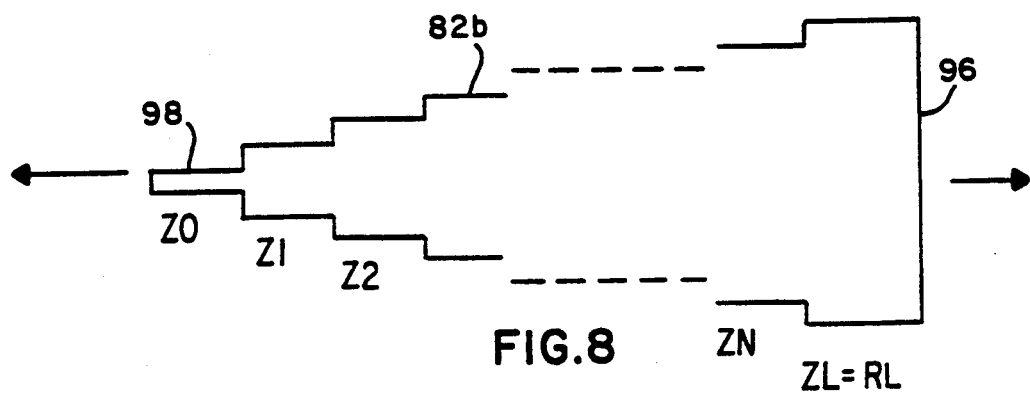
FIG. 8 is a schematic diagram of a multiple section quarter wave microstrip impedance transformer.

The dimensions and shape of conductor 82 determine the frequency response of the impedance transformer 80. As shown in FIG. 7, a tapered conductor 82a can be utilized. The wide end 92 of tapered conductor 82a is connected to optical amplifier 10, and the narrow end 94 is connected to detection circuit 28. The conductor 82a can have an exponential taper, a Chebyshef taper, a triangular taper, or any other suitable taper. A stepped conductor 82b, as shown in FIG. 8, can be utilized to form a multiple section quarter wave transformer. The wide end 96 of conductor 82b is connected to current injection terminal 22 of optical amplifier 10, and narrow end 98 is connected to the input of detection circuit 28. The quarter wave transformer can have a Chebyshef, binomial or other suitable characteristic. Details regarding tapered line impedance transformers and multiple section quarter wave transformers are disclosed by R. E. Collin in *Foundations for Microwave Engineering*, McGraw-Hill, 1966, Chapter 5, pages 203-257, which is hereby incorporated by reference. Details regarding the construction of microstrip transmission lines are disclosed by Harlan Howe, Jr. in *Stripline Circuit Design*, Artech House, 1974, which is hereby incorporated by reference.

Using the impedance transformers shown in FIGS. 6-8, impedance transformation from 50 ohms to about 15 ohms can be achieved without significant problems in either physical design or transmission characteristics. The bandwidth factor F is plotted in FIG. 12 as a function of load resistance $R_L$ for different optical amplifier configurations. Curves 100 and 102 plot the performance of amplifiers with gains of 20 dB and 25 dB, respectively, each having a junction resistance $R_j = 1$ ohm and a series resistance $R_s = 2$ ohms. From curve 102, it can be seen that the bandwidth factor F is improved from about 4 for a 50 ohm load to about 11 for a 15 ohm load. In this case, the optical amplifier-receiver has a potential bandwidth as high as 5.5 GHz when $\frac{1}{2}\pi\tau = 500$ MHz.

For optical amplifiers with gain G = 30 dB, the bandwidth factor F can be larger than 35 for a 15 ohm load. When F is sufficiently large, the bandwidth of the optical amplifier-receiver may be limited by the external circuit, including the microstrip transformer. For example, F = 35 implies a potential bandwidth of 17.5 GHz. A quarter wave transformer may have a center frequency of 12 GHz with a percentage bandwidth of 100%, which allows the detection circuit to operate in the frequency band from 6 GHz to 17.5 GHz. The tapered transmission lines have a high pass characteristic with a cutoff frequency at the low frequency end and are virtually unlimited in bandwidth.

Figure 9:
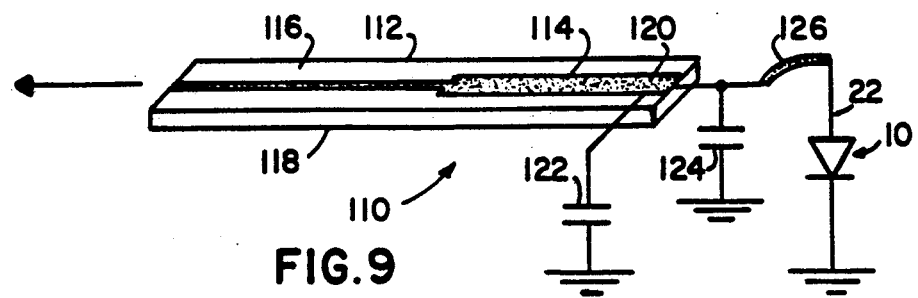
FIG. 9 is a schematic diagram of a hybrid impedance transformer connected to a semiconductor optical amplifier in an optical amplifier receiver system.

An embodiment of the impedance transformer 26 which provides a lower load impedance to the optical amplifier-receiver than the microstrip impedance transformer described above is shown in FIGS. 9-11. A passive hybrid impedance transformer is used to achieve impedance transformation from 50 ohms to about 1 to 10 ohms. As shown in FIG. 9, a hybrid impedance transformer 110 includes a microstrip impedance transformer 112 having a patterned conductor 114 affixed to one surface of a substrate 116 and a ground plane conductor 118 affixed to the other surface of substrate 116. The microstrip impedance transformer transforms the impedance from 50 ohms to about 15 ohms. The hybrid impedance transformer 110 further comprises a lumped element impedance transformer including an extension 120 of the conductor 114 and lumped element shunt capacitors 122 and 124. Capacitor 122 is connected between one end of extension 120 and ground, and capacitor 124 is connected between the other end of extension 120 and ground. The extension 120 of conductor 114 and shunt capacitors 122 and 124 transform the impedance from 15 ohms to about 2-3 ohms. A bond wire 126 is connected between current injection terminal 22 of optical amplifier 10 and the junction of extension 120 and capacitor 124. Further details regarding the hybrid impedance transformer are provided by A. Ghiasi et al in "Novel Wide Bandwidth Matching Technique for Laser Diodes", *IEEE Transactions on Microwave Theory and Techniques*, Vol. 38, No. 5, May 1990, pages 673-675, which is hereby incorporated by reference.

Figure 10:
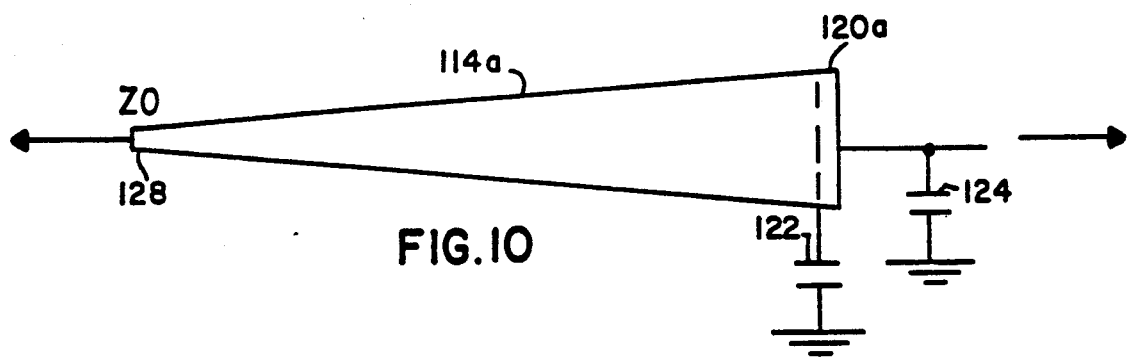
FIG. 10 is a schematic diagram of a hybrid impedance transformer using a tapered microstrip transmission line and a lumped element impedance transformer.
Figure 11:
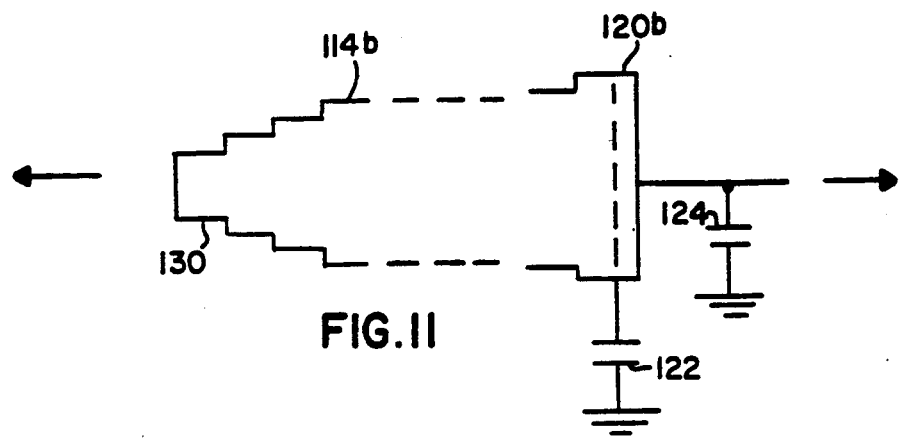
FIG. 11 is a schematic diagram of a hybrid impedance transformer using a microstrip multiple section quarter wave transformer and a lumped element impedance transformer.

As shown in FIG. 10, the hybrid impedance transformer can utilize a tapered transmission line. A tapered conductor 114a can have an exponential taper, a Chebyshef taper, a triangular taper, or any other suitable taper. Capacitors 122 and 124 are connected to opposite ends of extension 120a of conductor 114a. Capacitor 124 is connected to optical amplifier 10, and the narrow end 128 of conductor 114a is connected to the input of detection circuit 28. A hybrid impedance transformer utilizing a multiple section quarter wave transformer is shown in FIG. 11. A stepped conductor 114b can be configured as a Chebyshef transformer, a binomial transformer, or any other suitable transformer. Capacitors 122 and 124 are connected to opposite ends of extension 120b of conductor 114b. Capacitor 124 is connected to optical amplifier 10, and the narrow end of 130 of conductor 114b is connected to the input of detection circuit 28.

Figure 12:
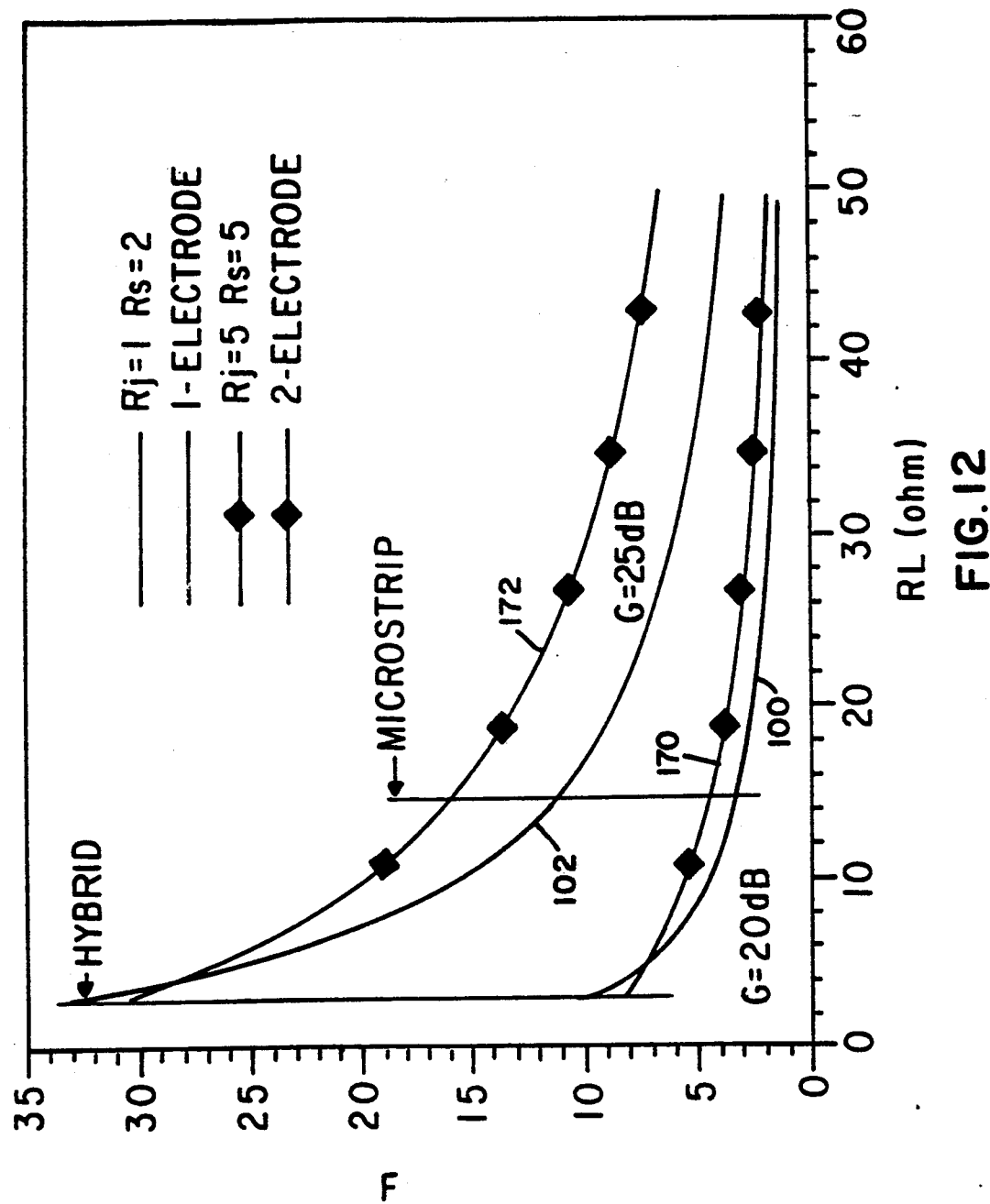
FIG. 12 is a graph showing bandwidth factor F as a function of load impedance for different passive impedance transformer configurations and for different optical amplifier configurations.

The bandwidth factor F attainable with a hybrid impedance transformer is shown in FIG. 12. From curve 102 in FIG. 12, it can be seen that the bandwidth factor F is improved from 4 for a 50 ohm load to about 33 for a 3 ohm load for an optical amplifier having an optical gain G=25 dB. In this case, the bandwidth of the optical amplifier-receiver is limited by the bandwidth of the external circuit (including the hybrid impedance transformer), rather than the bandwidth given by equation (9).

The input impedance of the impedance transformers described above is selected such that the bandwidth a which the carrier to-noise ratio of the optical amplifier receiver system is degraded by 3 dB exceeds the value of $\frac{1}{2}\pi\tau$ by 1.5 or more, where $\tau$ is the carrier lifetime of the optical amplifier. Preferably, the input impedance of the impedance transformer does not exceed about 10 times $R_j+R_s$, where $R_j$ is the junction resistance of the optical amplifier and $R_s$ is the series resistance of the optical amplifier. The impedance transformer typically has an input impedance of about 1 to 15 ohms.

Figure 13:
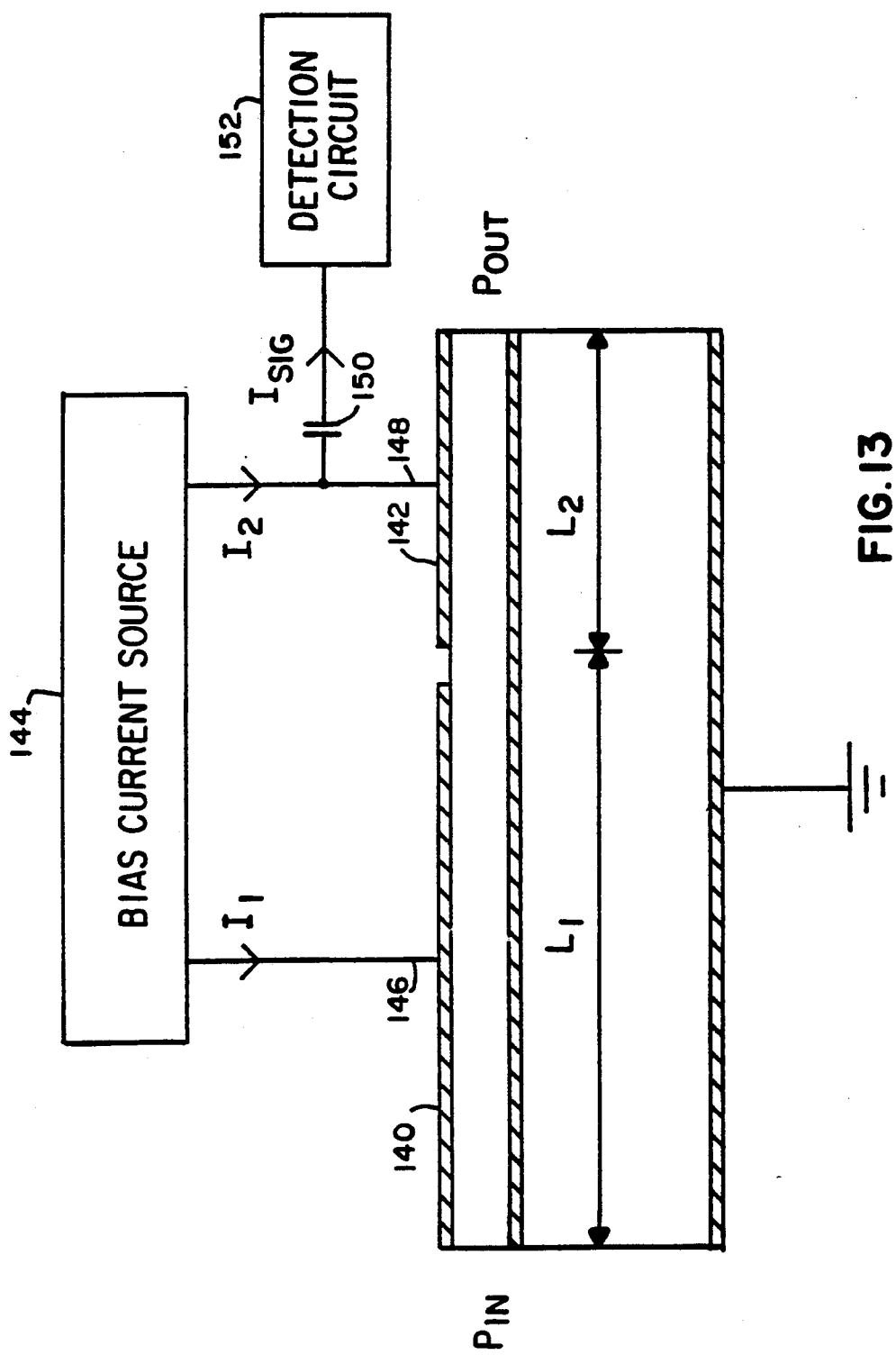
FIG. 13 is a cross-sectional view of a semiconductor optical amplifier having two current injection electrodes.

As described above, the carrier to noise ratio CNR is degraded by the thermal noise of the receiver, and the degradation becomes worse at higher frequencies. The degradation in CNR can be overcome by providing a semiconductor optical amplifier which has a higher junction resistance. In accordance with another aspect of the invention, there is provided a semiconductor optical amplifier receiver which has a higher junction resistance and lower spontaneous emission noise than prior art optical amplifiers. A large improvement in the amplifier response can be achieved by increasing the junction resistance $R_j$ of the optical amplifier from 1 ohm to 5-10 ohms. An optical amplifier having two current injection electrodes is shown in FIG. 13 A first current injection electrode 140 has a length $L_1$. The section of the optical amplifier adjacent to electrode 140 has a gain $G_1$. A second current injection electrode 142 has a length $L_2$. The section of the optical amplifier adjacent to electrode 142 has a gain $G_2$. A total amplifier length L is given by $L_1+L_2$, and a total amplifier gain G is given by $G_1 \cdot G_2$.

A bias current source 144 supplies bias currents $I_1$ and $I_2$ to electrodes 140 and 142 through current injection terminals 146 and 148, respectively. Current injection terminal 148 is connected through a coupling capacitor 150 to a detection circuit 152, which can be an RF or microwave receiver, or any other suitable circuit for utilizing the detected optical signal that appears at current injection terminal 148. The semiconductor optical amplifier shown in FIG. 13 is generally the same as the optical amplifier shown in FIGS. 2A-2C and described hereinabove, except that two current injection electrodes 140 and 142 are provided in the amplifier of FIG. 13. For simplicity, it has been assumed that the bias currents $I_1$ and $I_2$ are proportional to the lengths $L_1$ and $L_2$ of the two amplifier sections. Thus, the bias currents are such that the material gain per unit length is the same in the two sections of the optical amplifier.

The expressions for the responsivity and noise of the optical amplifier of FIG. 13 are given as $$\eta = n_{sp}G_1(G_2 1)e/h\upsilon \quad (12)$$

$$I^2_{sig-sp} = n_{sp}^2(\log G_2) 2e^2 n_{sp} \{G^2 - G_1^2 + 2G\log G_2 - 4(G-G_1)\} \times P_{in}/h\upsilon/[1+(\omega\tau)^2] \quad (13)$$

$$I^2_{sp-sp} = n_{sp}^2(\log G_2)e^2 n_{sp}\{G^2 - G_1^2 + G_2^2 + 8G \log G_2 - 12(G-G_1+G_2)\}\Delta f/[1+(\omega\tau)^2] \quad (14)$$

Note that if $G_1=1$ and $G=G_2$, equations (12) to (14) reduce to equations (2), (4) and (5), respectively, for a single electrode optical amplifier. The 3 dB bandwidth and the CNR for a 1 GHz signal were calculated at different amplifier gains for optical amplifiers with a junction resistance $R_j=1$ ohm (single current injection electrode), a junction resistance $R_j=4$ ohms (two electrodes with $L_2=0.25L$) and a junction resistance $R_j=10$ ohms (two electrodes with $L_2=0.10L$). These calculations demonstrate that an optical amplifier with a second electrode 142 length $L_2$ of 10% or 25% of the total amplifier length L has a low frequency CNR which is 4 to 5 dB better than that of the single electrode optical amplifier. The improvement in bandwidth is more dramatic. For an amplifier with 30 dB total gain, the bandwidth is 2.5 GHz for a single electrode optical amplifier, 4.3 GHz for an optical amplifier with second electrode length $L_2=0.25L$, and 5.9 GHz for an amplifier with second electrode length $L_2=0.10L$. Typically, the second electrode 142 has a length $L_2$ that is selected such that the second amplifier section has a junction resistance $R_j$ of at least about one ohm.

In accordance with a further embodiment of the optical amplifier-receiver shown in FIG. 13, the bias current $I_2$ supplied to electrode 142 is reduced and the bias current $I_1$ supplied to electrode 140 is increased so as to maintain a predetermined total optical gain G. Under these conditions, the junction resistance $R_j$ of the amplifier section associated with electrode 142 is further increased, as is the spontaneous emission factor $n_{sp2}$ which controls the intrinsic responsivity of the amplifier receiver.

In accordance with further embodiments of the invention, the two electrode optical amplifier shown in FIG. 13 can be utilized with an impedance transformer having a low input impedance as shown generally in FIG. 1 and described hereinabove. In a first example, the two electrode optical amplifier is utilized with a bipolar transistor circuit as shown in FIG. 4 and described hereinabove. The optical amplifier and the transistor circuit can be fabricated in a monolithic integrated circuit or a hybrid integrated circuit. The bandwidth and carrier to noise ratio for optical amplifier receivers having two electrodes and utilizing a bipolar transistor operating in the common base mode as shown in FIG. 4, with an emitter resistance of 10 ohms, have been calculated for an optical amplifier with 30 dB gain and electrode 142 length $L_2 = 0.25L$. The bandwidth is increased to about 14 GHz from a value of 4.3 GHz with a 50 ohm load.

The bandwidth factor F as a function of emitter current $I_e$ for two electrode optical amplifiers utilized with a common base bipolar transistor circuit is shown in FIG. 5. Curve 160 shows the bandwidth factor F for an amplifier having an optical gain G of 25 dB, and curve 162 shows the bandwidth factor F for an amplifier having an optical gain G of 20 dB. For curves 160 and 162, the junction resistance $R_j = 5$ ohms and the series resistance $R_s = 5$ ohms.

In accordance with a further aspect of the invention, the two electrode optical amplifier shown in FIG. 13 is utilized with a microstrip impedance transformer as shown in FIGS. 6-8 and described hereinabove or a hybrid impedance transformer as shown in FIGS. 9-11 and described hereinabove. The bandwidth factor F is plotted in FIG. 12 as a function of load resistance $R_L$ for the two electrode optical amplifier configuration. Curve 170 shows bandwidth factor F for an amplifier having an optical gain G of 20 dB, and curve 172 shows bandwidth factor F for an optical amplifier having an optical gain G of 25 dB. In each case, the junction resistance $R_j = 5$ ohms, and the series resistance $R_s = 5$ ohms. From curve 172, it can be seen that the bandwidth factor F is improved from 7 for a 50 ohm load to about 15 for a 15 ohm load when a microstrip impedance transformer is used. In this case the optical amplifier-receiver has a potential bandwidth of 7.5 GHz if $\frac{1}{2}\pi\tau = 500$ MHz. For optical amplifiers with gain $G = 30$ dB, the bandwidth factor F can be larger than 50 for a 15 ohm load. When F is sufficiently large, the bandwidth of the optical amplifier receiver may be limited by the external circuit, including the microstrip transformer.

From curve 172 in FIG. 12, it can be seen that the bandwidth factor F is improved from 7 for a 50 ohm load to about 30 for a 3 ohm load when a hybrid impedance transformer is used. In this case, the optical amplifier receiver has a potential bandwidth as high as 15 GHz if $\frac{1}{2}\pi\tau = 500$ MHz. When F is sufficiently large, the bandwidth of the optical amplifier-receiver is limited by the external circuit, including the hybrid impedance transformer.

Figure 14:
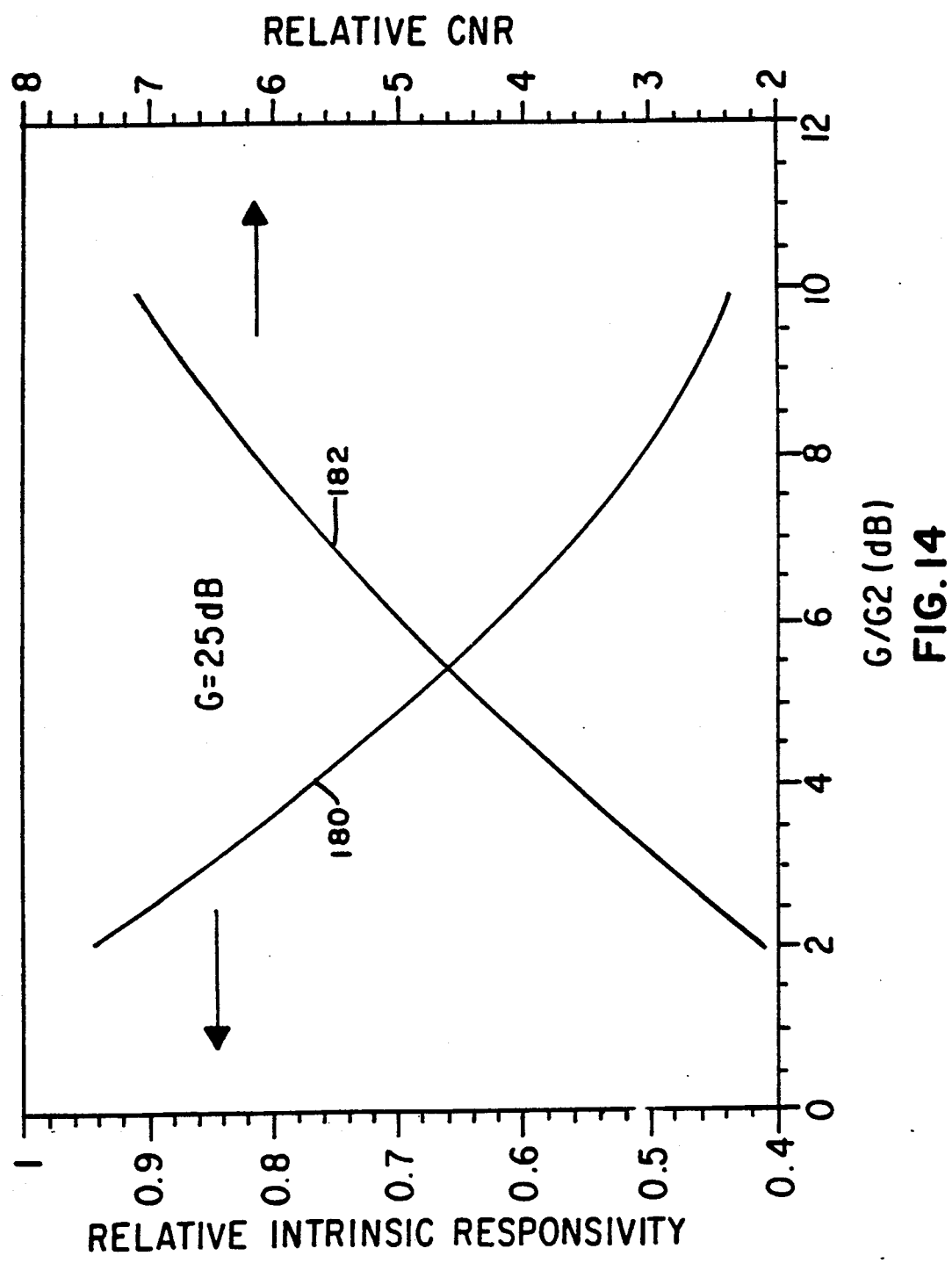
FIG. 14 is a graph showing relative intrinsic responsivity and relative intrinsic $CNR_i$ as a function of gain ratio for an optical amplifier having two electrodes.

In FIG. 14, the relative intrinsic responsivity and relative intrinsic carrier to noise ratio $CNR_i$ are plotted as a function of $G/G_2$ for a two electrode optical amplifier having a total gain $G = 25$ dB. The relative responsivity is plotted as curve 180, and the relative $CNR_i$ is plotted as curve 182. From FIG. 14, it can be seen that, as the gain $G_2$ is increased, there is some reduction in the responsivity of the amplifier-receiver, but there is a large increase in the received intrinsic CNR and thus improved overall receiver performance.

While there have been shown and described what are at present considered the preferred embodiments of the present invention, it will be obvious to those skilled in the art that various changes and modifications may be made therein without departing from the scope of the invention as defined by the appended claims.

What is claimed is:

1. An optical amplifier receiver system comprising:
    a semiconductor optical amplifier including an optical input for receiving an optical signal comprising an optical carrier modulated with a modulation signal, an optical output for providing an amplified optical signal, and a current injection electrode;
    a bias current source connected to the current injection electrode of said optical amplifier for supplying a bias current to said optical amplifier;
    a detection circuit for receiving said modulation signal, said detection circuit having a characteristic input impedance; and
    an impedance transformer for coupling said modulation signal from the current injection electrode of said optical amplifier to the input of said detection circuit, said impedance transformer having an input impedance that is lower than the characteristic input impedance of said detection circuit.

2. An optical amplifier receiver system as defined in claim 1 wherein said detection circuit has a characteristic input impedance of about 50 ohms.

3. An optical amplifier receiver system as defined in claim 1 wherein said impedance transformer comprises a microstrip transmission line.

4. An optical amplifier-receiver system as defined in claim 3 wherein said microstrip transmission line has an input impedance of 15 ohms.

5. An optical amplifier-receiver system as defined in claim 3 wherein said microstrip transmission line comprises a tapered transmission line.

6. An optical amplifier-receiver system as defined in claim 5 wherein said tapered transmission line includes a conductor having a taper selected from the group consisting of an exponential taper, Chebyshef taper, and a triangular taper.

7. An optical amplifier receiver system as defined in claim 3 wherein said microstrip transmission line comprises a multiple section quarter wave impedance transformer.

8. An optical amplifier receiver system as defined in claim 7 wherein said multiple section quarter wave impedance transformer has a characteristic selected from the group consisting of a Chebyshef characteristic and a binomial characteristic.

9. An optical amplifier-receiver system as defined in claim 1 wherein said impedance transformer comprises a hybrid impedance transformer.

10. An optical amplifier receiver system as defined in claim 9 wherein said hybrid impedance transformer includes a microstrip transmission line and a lumped element impedance transformer.

11. An optical amplifier-receiver system as defined in claim 9 wherein said hybrid impedance transformer has an input impedance of 1 to 10 ohms.

12. An optical amplifier-receiver system as defined in claim 10 wherein said microstrip transmission line comprises a tapered transmission line.

13. An optical amplifier receiver system as defined in claim 10 wherein said microstrip transmission line comprises a multiple section quarter wave impedance transformer.

14. An optical amplifier receiver system as defined in claim 10 wherein said lumped element impedance transformer comprises a section of microstrip transmission line having shunt capacitors connected to opposite ends thereof.

15. An optical amplifier receiver system as defined in claim 1 wherein said impedance transformer comprises a common base bipolar junction transistor circuit including a bipolar transistor having an emitter coupled to said current injection terminal.

16. An optical amplifier-receiver system as defined in claim 1 wherein said impedance transformer includes equalizer means for controlling the electrical frequency response of said optical amplifier-receiver system.

17. An optical amplifier receiver system as defined in claim 1 wherein the input impedance of said impedance transformer is selected such that the bandwidth at which the carrier-to-noise ratio of the optical amplifier receiver system is degraded by 3 dB exceeds the value of $\frac{1}{2}\pi\tau$ by 1.5 or more, where $\tau$ is the carrier lifetime of the optical amplifier.

18. An optical amplifier-receiver system as defined in claim 1 wherein the input impedance of said impedance transformer does not exceed 10 times $R_j + R_s$, where $R_j$ is the junction resistance of the optical amplifier and $R_s$ is the series resistance of the optical amplifier.

19. An optical amplifier receiver system comprising:
a semiconductor optical amplifier including an optical input for receiving an optical signal, an optical output for providing an amplified optical signal, and a current injection electrode, said optical amplifier providing an electrical signal on said current injection electrode in response to said optical signal;
a bias current source connected to the current injection electrode of said optical amplifier for supplying a bias current to said optical amplifier;
a detection circuit; and
an impedance transformer for coupling said electrical signal from the current injection electrode of said optical amplifier to the input of said detection circuit, said impedance transformer having an input impedance that does not exceed 10 times $R_j + R_s$, where $R_j$ is the junction resistance of said optical amplifier and $R_s$ is the series resistance of said optical amplifier.

20. An optical amplifier-receiver as defined in claim 19 wherein said impedance transformer has an output impedance that is substantially equal to the input impedance of said detection circuit.

21. An optical amplifier-receiver as defined in claim 19 wherein said impedance transformer comprises a microstrip transmission line.

22. An optical amplifier-receiver as defined in claim 21 wherein said microstrip transmission line comprises a tapered transmission line.

23. An optical amplifier-receiver as defined in claim 21 wherein said microstrip transmission line comprises a multiple section quarter wave impedance transformer.

24. An optical amplifier-receiver as defined in claim 19 wherein said impedance transformer comprises a hybrid impedance transformer.

25. An optical amplifier-receiver as defined in claim 24 wherein said hybrid impedance transformer includes a microstrip transmission line and a lumped element impedance transformer.

26. An optical amplifier-receiver as defined in claim 19 wherein said impedance transformer comprises a common base bipolar junction transistor circuit including a bipolar transistor having an emitter coupled to said current injection terminal.

27. An optical amplifier-receiver as defined in claim 19 wherein said impedance transformer includes equalizer means for controlling the electrical frequency response of said optical amplifier-receiver system.

* * * * *